United States Patent
Higashino et al.

(10) Patent No.: US 9,786,924 B2
(45) Date of Patent: Oct. 10, 2017

(54) ELECTRODE MATERIAL FOR FUEL ELECTRODE, SOLID ELECTROLYTE-ELECTRODE LAMINATE, METHOD FOR PRODUCING SOLID ELECTROLYTE-ELECTRODE LAMINATE, AND FUEL CELL

(71) Applicant: SUMITOMO ELECTRIC INDUSTRIES, LTD., Osaka-shi, Osaka (JP)

(72) Inventors: Takahiro Higashino, Itami (JP); Masatoshi Majima, Itami (JP); Naho Mizuhara, Itami (JP); Chihiro Hiraiwa, Itami (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 14/912,467

(22) PCT Filed: Aug. 5, 2014

(86) PCT No.: PCT/JP2014/070582
§ 371 (c)(1),
(2) Date: Feb. 17, 2016

(87) PCT Pub. No.: WO2015/029713
PCT Pub. Date: Mar. 5, 2015

(65) Prior Publication Data
US 2016/0204446 A1    Jul. 14, 2016

(30) Foreign Application Priority Data
Aug. 27, 2013  (JP) .................................. 2013-175552

(51) Int. Cl.
*H01M 4/90* (2006.01)
*H01M 4/86* (2006.01)
(Continued)

(52) U.S. Cl.
CPC ....... *H01M 4/9041* (2013.01); *H01M 4/8652* (2013.01); *H01M 4/8657* (2013.01);
(Continued)

(58) Field of Classification Search
None
See application file for complete search history.

(56) References Cited

U.S. PATENT DOCUMENTS

| 6,528,195 B1 | 3/2003 | Taniguchi | |
| 2002/0081762 A1* | 6/2002 | Jacobson | H01M 4/9016 438/32 |

(Continued)

FOREIGN PATENT DOCUMENTS

| CN | 101079495 A1 | 11/2007 |
| JP | 2000-302550 A | 10/2000 |

(Continued)

OTHER PUBLICATIONS

Coors, W. Grover, et al., "Characterization of composite cermet with 68 wt.% NiO and $BaCe_{0.2}Zr_{0.6}Y_{0.2}O_{3-\delta}$", Journal of Membrane Science, 376 (2011), pp. 50-55.

(Continued)

*Primary Examiner* — Wyatt McConnell
(74) *Attorney, Agent, or Firm* — Drinker Biddle & Reath LLP (57) ABSTRACT

The present invention inexpensively provides an electrode material for a fuel electrode, the electrode material having $CO_2$ resistance and being capable of forming a fuel cell having high electricity generation performance. An electrode material for a fuel electrode, the electrode material (Continued)

constituting a fuel electrode of a fuel cell including a proton-conductive solid electrolyte layer, includes a perovskite-type solid electrolyte component and a nickel (Ni) catalyst component, in which the solid electrolyte component includes a barium component, a zirconium component, a cerium component, and a yttrium component, and the mixture ratio of the zirconium component to the cerium component in the solid electrolyte component is set to be 1:7 to 7:1 in terms of molar ratio.

13 Claims, 7 Drawing Sheets

(51) Int. Cl.
  *H01M 4/88* (2006.01)
  *H01M 8/1016* (2016.01)
  *H01M 8/1253* (2016.01)
  *H01M 8/126* (2016.01)
  *H01M 8/1213* (2016.01)

(52) U.S. Cl.
  CPC ....... *H01M 4/8875* (2013.01); *H01M 4/8885* (2013.01); *H01M 4/8889* (2013.01); *H01M 4/9066* (2013.01); *H01M 8/1016* (2013.01); *H01M 8/126* (2013.01); *H01M 8/1213* (2013.01); *H01M 8/1253* (2013.01); *H01M 2300/0074* (2013.01); *H01M 2300/0077* (2013.01); *Y02E 60/525* (2013.01); *Y02P 70/56* (2015.11)

(56) References Cited

U.S. PATENT DOCUMENTS

| | | |
|---|---|---|
| 2003/0027033 A1 | 2/2003 | Seabaugh et al. |
| 2015/0044596 A1 | 2/2015 | Hiraiwa et al. |
| 2015/0044597 A1 | 2/2015 | Hiraiwa et al. |

FOREIGN PATENT DOCUMENTS

| | | |
|---|---|---|
| JP | 2005-019041 A | 1/2005 |
| JP | 2005-336022 A | 12/2005 |
| JP | 2007-197315 A | 8/2007 |
| JP | 2012-069380 A | 4/2012 |
| JP | 2012-234747 A | 11/2012 |
| JP | 2013-078714 A | 5/2013 |
| JP | 2013-143242 A | 7/2013 |
| JP | 2013-539589 A | 10/2013 |
| WO | WO-2009/063598 A1 | 5/2009 |

OTHER PUBLICATIONS

"Georgia Tech's new ceramic may expand SOFC use," an article in Fuel Cells Bulletin, Elsevier Advanced Technology, Nov. 2009, p. 11.

Klinsrisuk, S., et al., "Fabrication and electrochemical characterization of tape cast $BaCe_{0.5}Zr_{0.3}Y_{0.16}Zn_{0.04}O_{3-\delta}$ electrode/electrolyte structures," Solid State Ionics, 181 (2010), pp. 168-172.

* cited by examiner

ELECTRODE MATERIAL FOR FUEL ELECTRODE, SOLID ELECTROLYTE-ELECTRODE LAMINATE, METHOD FOR PRODUCING SOLID ELECTROLYTE-ELECTRODE LAMINATE, AND FUEL CELL

TECHNICAL FIELD

The present invention relates to an electrode material for a fuel electrode in a solid oxide fuel cell. More particularly, the invention relates to an electrode material for a fuel electrode, the electrode material constituting a fuel electrode of a fuel cell including a solid electrolyte layer having proton conductivity, a solid electrolyte-electrode laminate formed using the same, a method for producing a solid electrolyte-electrode laminate, and a fuel cell.

BACKGROUND ART

A solid oxide fuel cell (hereinafter referred to as the "SOFC") includes a solid electrolyte-electrode laminate in which a fuel electrode and an air electrode are disposed on both sides of a solid electrolyte layer.

As materials constituting the solid electrolyte layer in the SOFC, yttrium doped barium cerate (hereinafter referred to as "BCY") and yttrium doped barium zirconate (hereinafter referred to as "BZY"), which are perovskite-type oxides, are known. The solid oxides have good proton conductivity at low to medium temperatures, not higher than 700° C., and therefore are considered as promising electrode materials for SOFCs operated at low to medium temperatures.

The fuel electrode of the SOFC is typically formed by adding a catalyst component to the solid oxide constituting the solid electrolyte layer. A noble metal such as platinum is used as the catalyst component, which gives rise to a problem of increased production costs. In order to avoid the problem, it is possible to use inexpensive nickel (Ni) as a catalyst.

Furthermore, in order to decrease the ionic conductivity resistance in the solid electrolyte layer, it is desirable to decrease the thickness of the solid electrolyte layer as much as possible. However, when the solid electrolyte layer is thinly formed, the strength of the solid electrolyte layer is decreased, which causes problems in the production process and during use. Accordingly, in many cases, a solid electrolyte-electrode laminate having a structure (anode support structure), in which a solid electrolyte layer is formed on a surface of a thickly formed fuel electrode so as to secure the strength as the laminate, is employed.

In order to produce the solid electrolyte-electrode laminate, a method may be employed, in which solid electrolyte powder is thinly applied onto a fuel electrode powder molded body, the resulting laminate is fired to integrally form a solid electrolyte-fuel electrode laminate, and then an air electrode is formed thereon.

PTL 1: Japanese Unexamined Patent Application Publication No. 2005-19041

SUMMARY OF INVENTION

Technical Problem

In a fuel electrode in which BCY is used as a solid electrolyte material and Ni is added as a catalyst component to the BCY, the electrolyte material is likely to be decomposed by reaction with $CO_2$, and it is not possible to secure the required durability. Therefore, it is not possible to use, as a fuel, gas containing $CO_2$, such as reformed gas, which is a problem.

In order to avoid the problem described above, it may be possible to use a hydrogen separation membrane composed of a noble metal, which, however, gives rise to a problem of increased production costs.

On the other hand, a fuel electrode, in which BZY is used as a solid electrolyte material and Ni is added as a catalyst component to the BZY, is stable against $CO_2$. However, when a fuel electrode material in which Ni is added as a catalyst to BZY is used, the electricity generation performance of the fuel cell decreases, which is a problem.

In particular, in the fuel cell having the anode support structure obtained by applying the BZY powder, as a solid electrolyte material, onto the surface of a molded body formed by subjecting a powder material for the fuel electrode to compression molding at a predetermined thickness, followed by integral sintering, the electricity generation performance is often lower than that theoretically expected.

Although the detailed reason for the decrease in the electricity generation performance is not clear, it has been confirmed that Ni added to the electrode layer acts on BZY in the fuel electrode and its adjacent electrolyte layer to produce a reaction product. It can be assumed that this reaction causes the components in BZY to flow out and decreases the conductivity of BZY, or the reaction product itself hinders electrical conductivity and ionic conductivity.

The present invention has been devised in order to resolve the problems described above, and it is an object of the present invention to provide an electrode material for a fuel electrode, in which the electrode material can secure $CO_2$ resistance and does not decrease the electrical conductivity of the fuel electrode or the ionic conductivity of the solid electrolyte layer.

Solution to Problem

According to an embodiment of the present invention, an electrode material for a fuel electrode, the electrode material constituting a fuel electrode of a fuel cell including a proton-conductive solid electrolyte layer, includes a perovskite-type solid electrolyte component and a nickel (Ni) catalyst component, in which the solid electrolyte component includes a barium component, a zirconium component, a cerium component, and a yttrium component, and the mixture ratio of the zirconium component to the cerium component in the solid electrolyte component is set to be 1:7 to 7:1 in terms of molar ratio.

Advantageous Effects of Invention

It is possible to provide an electrode material for a fuel electrode, in which the electrode material has $CO_2$ resistance and does not decrease the electrical conductivity of the fuel electrode or the ionic conductivity of the electrolyte layer.

DESCRIPTION OF EMBODIMENTS

[General Description of Embodiments of the Present Invention]

According to an embodiment of the present invention, an electrode material for a fuel electrode, the electrode material constituting a fuel electrode of a fuel cell including a proton-conductive solid electrolyte layer, includes a perovskite-type solid electrolyte component and a nickel (Ni) catalyst component, in which the solid electrolyte component includes a barium component, a zirconium component, a cerium component, and a yttrium component, and the mixture ratio of the zirconium component to the cerium component in the solid electrolyte component is set to be 1:7 to 7:1 in terms of molar ratio.

It has been found that in a solid solution formed of a composite of BCY and BZY (hereinafter referred to as BZCY), not only is the $CO_2$ resistance of BZY imparted thereto, but also the decrease in electricity generation performance, which is a problem in BZY, is improved.

By firing a molded body made of a material formed of a composite of BCY and BZY, a solid solution is formed. The solid solution has higher stability than simple BCY and simple BZY, and therefore it is assumed that $CO_2$ resistance improves.

A BZY fuel electrode employing a Ni catalyst is composed of a powder mixture of BZY powder and NiO powder, and it is believed that, in the sintering process, the following reaction takes place:

$$Ba_{10}(Zr_8Y_2)O_{29} + 2NiO \rightarrow Ba_8Zr_8O_{24} + BaY_2NiO_5 + BaNiO_2$$ (Reaction formula 1)

The $BaY_2NiO_5$ is considered to be a material with high resistance, and the yttrium component and the barium component flow out of BZY. For this reason, it is assumed that the electrical conductivity in the fuel electrode and the electrolyte decreases.

It has been found that, in a fuel electrode formed by sintering a composite material of BCY and BZY, the formation of $BaY_2NiO_5$ is suppressed. It has also been found that, the electricity generation performance of the fuel cell including this fuel electrode is higher than that of a fuel cell including the existing fuel electrode formed by adding Ni to BZY.

Preferably, the mixture ratio of BCY to BZY is set such that the mixture ratio of the zirconium component to the cerium component is 1:7 to 7:1 in terms of molar ratio.

When the mixture ratio of the zirconium component to the cerium component is less than 1:7 in terms of molar ratio, i.e., the amount of the zirconium component mixed relative to the cerium component is less than 1/7 in terms of molar ratio, it is not possible to secure $CO_2$ resistance. On the other hand, when the mixture ratio of the zirconium component to the cerium component is more than 7:1 in terms of molar ratio, i.e., the amount of the zirconium component mixed relative to the cerium component is more than 7 times in terms of molar ratio, it is not possible to sufficiently suppress the amount of $BaY_2NiO_5$ produced.

More preferably, the mixture ratio of the zirconium component to the cerium component in the solid electrolyte component is set to be 2.5:5.5 to 7:1 in terms of molar ratio. By setting the mixture ratio of the zirconium component to the cerium component to be 2.5:5.5 or more in terms of molar ratio, i.e., by setting the amount of the zirconium component mixed relative to the cerium component to be 2.5/5.5 or more in terms of molar ratio, it is possible to secure sufficient $CO_2$ resistance.

The amount of the Ni catalyst added is not particularly limited as long as the required catalyst performance is achieved. The content of the Ni catalyst component is desirably set to be 40% to 80% by volume relative to the total volume.

When the amount of the Ni catalyst component mixed is less than 40% by volume, it is not possible to achieve a sufficient catalytic function, and the performance of the fuel cell decreases. On the other hand, when the amount of the Ni component added is more than 80% by volume, shrinkage increases during hydrogen reduction of the fuel electrode, and the difference in the coefficient of thermal expansion increases. Therefore, peeling is likely to occur at the electrolyte-fuel electrode interface.

The electrode material for a fuel electrode according to the embodiment is applied not only to a powder material for a fuel electrode before molding, but also to a simple fuel electrode which has been fired, and a solid electrolyte-electrode laminate.

The material for the solid electrolyte layer in the solid electrolyte-electrode laminate is not particularly limited. It is preferable to use a composite material including a material of the same kind or a material having the same composition as the material constituting the fuel electrode.

That is, in a solid electrolyte-electrode laminate formed by integrally sintering a solid electrolyte layer and a fuel electrode, the fuel electrode is formed of the electrode material for a fuel electrode, and the solid electrolyte layer may include yttrium doped barium cerate (BCY), yttrium doped barium zirconate (BZY), or a solid solution of these materials. In this case, the affinity between the solid electrolyte and the electrode layer is increased, and the advantageous effects described above can be sufficiently obtained.

Furthermore, preferably, the solid electrolyte layer is composed of the same component as the solid electrolyte component in the electrode material for a fuel electrode described above.

The method for producing the solid electrolyte-electrode laminate is not particularly limited. For example, the solid electrolyte-electrode laminate can be produced by a method including a fuel electrode molding step in which, by molding the electrode material for a fuel electrode, a fuel electrode molded body is formed; a solid electrolyte deposition step in which a solid electrolyte material is deposited on one surface of the fuel electrode molded body; and a sintering step in which the fuel electrode molded body on which the solid electrolyte material has been deposited is sintered.

In the case where the electrode material for a fuel electrode is employed, the problems of the anode support structure described above can be resolved.

According to another embodiment of the present invention, a fuel cell includes a fuel electrode formed of the electrode material for a fuel electrode. According to this embodiment, it is possible to provide a fuel cell in which $CO_2$ resistance is exhibited and the electrical conductivity of the fuel electrode or the ionic conductivity of the electrolyte layer is not decreased.

[Detailed Description of Embodiments of the Present Invention]

The embodiments of the present invention will be described in detail below.

Figure 1:
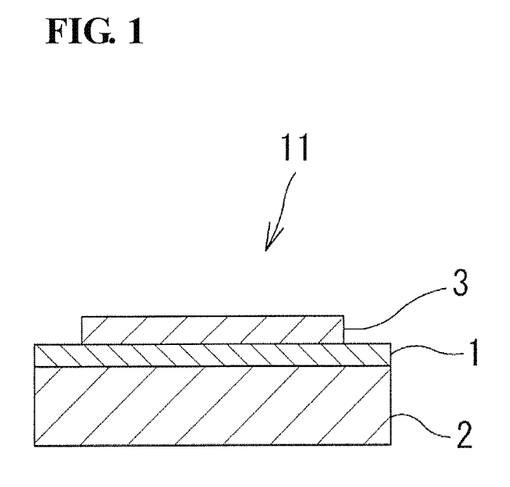
FIG. 1 is a cross-sectional view showing a structure of a solid electrolyte-electrode laminate according to an embodiment of the present invention.

FIG. 1 is a cross-sectional view showing a structure of a solid electrolyte-electrode laminate according to an embodiment of the present invention. A solid electrolyte-electrode laminate 11 includes a fuel electrode 2, an electrolyte layer 1, and an air electrode 3.

[Production of Solid Electrolyte]

Regarding the solid electrolyte according to an embodiment, barium carbonate, zirconium oxide, cerium oxide, and yttrium oxide powders were mixed at a predetermined ratio, and the mixture was pulverized and kneaded using a ball mill and then subjected to uniaxial compression molding, thereby forming a disk-shaped molded body. Subsequently, firing was performed at 1,600° C. for 10 hours to cause a solid-phase reaction, thereby forming a disk-shaped solid electrolyte. Subsequently, the disk-shaped solid electrolyte was pulverized using a pulverizer and then pulverized and kneaded using a ball mill to obtain a solid electrolyte powder. By changing the amounts of the zirconium oxide and the cerium oxide mixed, the following solid electrolytes were obtained. Note that the compositions of the samples shown in the graphs of the figures are also as follows:

$BaCe_{0.8}Y_{0.2}O_{2.9}$ (hereinafter, BCY)
$BaZr_{0.1}Ce_{0.7}Y_{0.2}O_{2.9}$ (hereinafter, BZCY17)
$BaZr_{0.25}Ce_{0.55}Y_{0.2}O_{2.9}$ (hereinafter, BZCY2555)
$BaZr_{0.4}Ce_{0.4}Y_{0.2}O_{2.9}$ (hereinafter, BZCY44)
$BaZr_{0.7}Ce_{0.1}Y_{0.2}O_{2.9}$ (hereinafter, BZCY71)
$BaZr_{0.8}Y_{0.2}O_{2.9}$ (hereinafter, BZY)

[$CO_2$ Resistance Verification Experiment]

After each of the solid electrolyte powders was treated in an atmosphere of 100% $CO_2$ gas at 600° C. for 2 hours, the decomposition rate of each of the solid electrolytes was measured. Regarding the decomposition rate, on the basis of XRD diffraction results after heat treatment, using the RIR method (reference intensity ratio method), the mass ratio of the original solid electrolyte and $BaCo_3$ was calculated from the reference intensity ratio determined for each substance and the peak intensity ratio, and the decomposition rate was obtained from the ratio of the amount of $BaCo_3$ produced to the remaining amount of the solid electrolyte.

Figure 2:
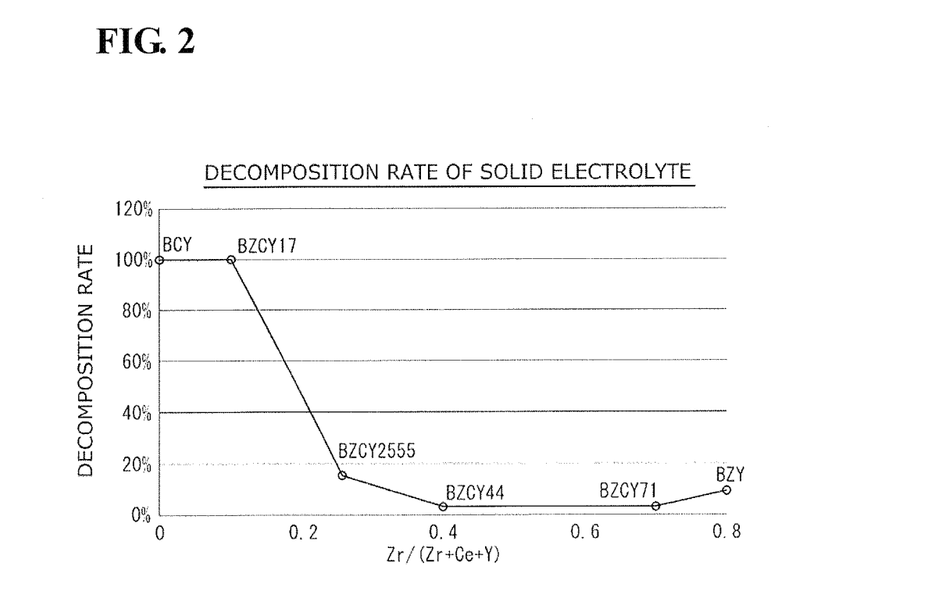
FIG. 2 is a graph showing the change in the decomposition rate of the solid electrolyte in relation to the change in the mixture ratio of BCY to BZY.

FIG. 2 shows the decomposition rates of the individual solid electrolytes. As is obvious from FIG. 2, in BCY, the electrolyte layer is decomposed 100%, while in BZCY2555, the decomposition rate is decreased to about 18%. Furthermore, it is found that when the amount of the zirconium component mixed is more than 10 mol %, $CO_2$ resistance improves. This result shows that, in order to improve $CO_2$ resistance, it is preferable to mix the materials such that the amount of the zirconium component mixed is more than 10 mol % relative to the total of the zirconium component, the cerium component, and the yttrium component in the solid electrolyte component. In this case, since the mixture ratio of the yttrium component is the same in BCY and BZY, the mixture ratio of the zirconium component to the cerium component is more than 1:7 in terms of molar ratio.

[Fabrication of Solid Electrolyte-Electrode Laminate Having Anode Support Structure]

NiO was added to each of the solid electrolyte materials such that 70% by volume of Ni was contained as a catalyst component, and each of the solid electrolyte materials was mixed, pulverized and kneaded using a ball mill, and then subjected to uniaxial compression molding, thereby forming a disk-shaped molded body constituting a fuel electrode. After the resulting molded body was temporarily sintered at 1,000° C., a BCY paste was applied by screen printing onto one side thereof, and the binder was removed at 750° C., followed by integral sintering at 1,400° C. Thereby, a solid electrolyte-fuel electrode laminate was obtained. Next, a lanthanum cobalt-ceria-based material (LSFC) for forming an air electrode was applied to a surface of the solid electrolyte layer, followed by sintering at 1,000° C. In such a manner, a solid electrolyte-electrode layer laminate 11 was fabricated. Note that the signs denoting the samples are the same as those in the $CO_2$ resistance verification experiment described above.

[Detection of Amount of Reaction Product Produced]

Using X-ray diffractometry (XRD), component analysis was performed on the product of each fuel electrode.

Figure 4:
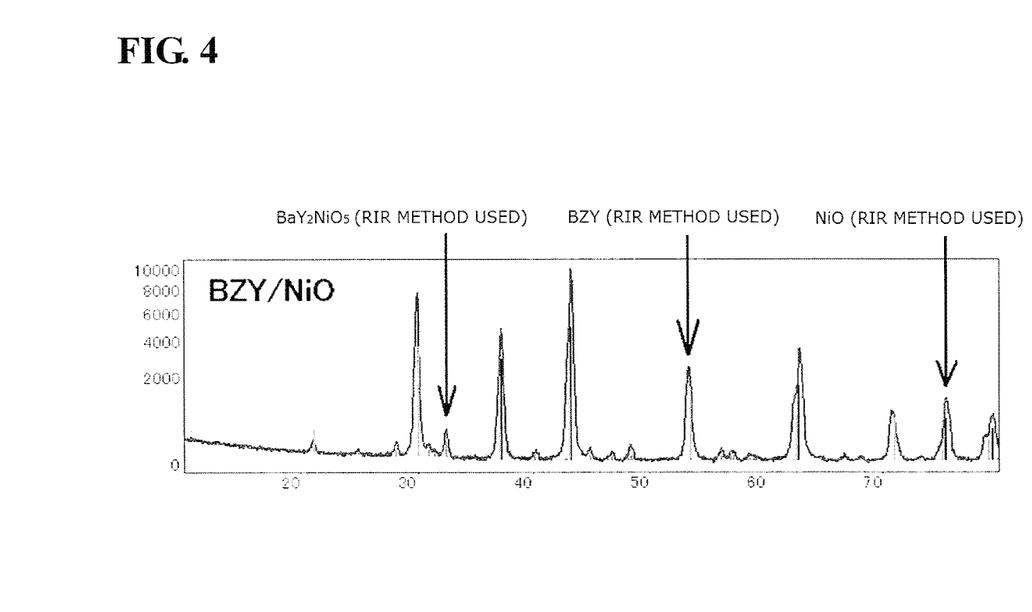
FIG. 4 shows detection data of a reaction product when a fuel electrode is formed by mixing nickel with BZY.
Figure 5:
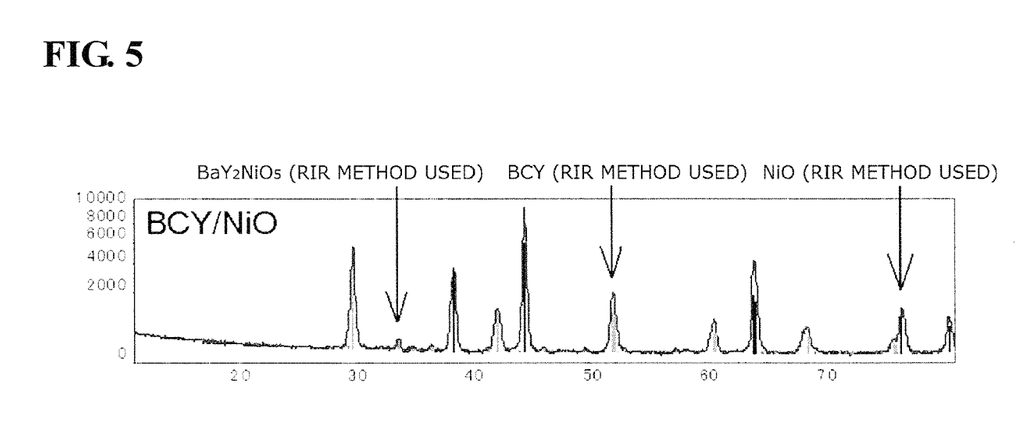
FIG. 5 shows detection data of a reaction product when a fuel electrode is formed by mixing nickel with BCY.
Figure 6:
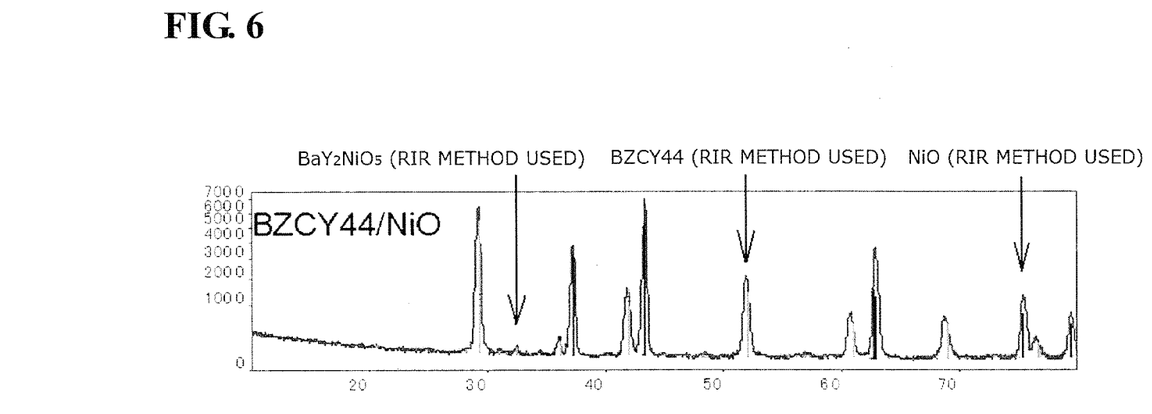
FIG. 6 shows detection data of a reaction product when a fuel electrode is formed by mixing nickel with a composite material of BZY and BCY.

(Measurement conditions)
X-ray used: Cu—Ka radiation
Line focus: 45 kV 40 mA
θ-2θ scan: 2θ=10° to 80°
Step width: 0.03°
Count time: 1 sec Parts of the X-ray diffractometry data are shown in FIGS. 4 to 6. FIG. 4 shows measurement data of a fuel electrode formed by adding Ni as a catalyst component to BZY. FIG. 5 shows measurement data of a fuel electrode formed by adding Ni as a catalyst component to BCY. FIG. 6 shows measurement data of a fuel electrode formed by adding Ni as a catalyst component to BCZY44. As is obvious from the data, in BZCY44, the amount of $BaY_2NiO_5$ produced is small compared with that in BZY and BCY.

Figure 3:
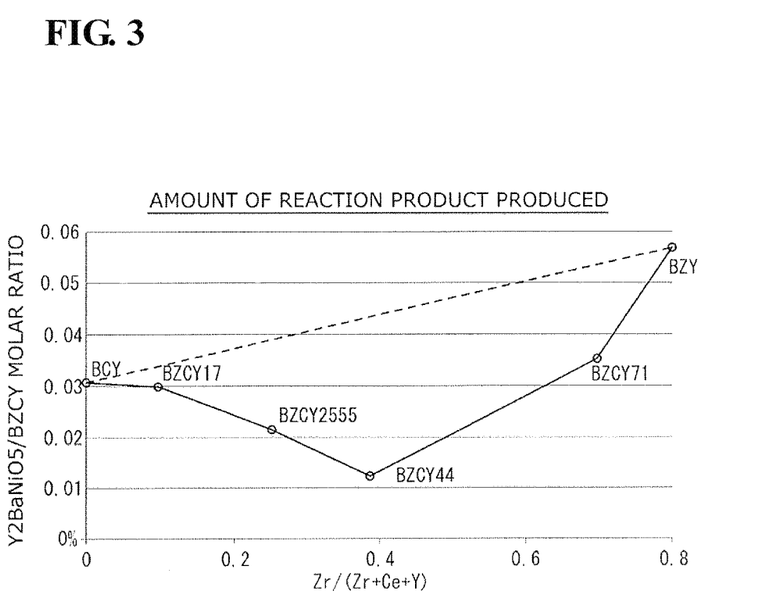
FIG. 3 is a graph showing the change in the amount of a reaction product produced in relation to the change in the mixture ratio of BCY to BZY.

Using the X-ray diffractometry data on the individual samples, a graph shown in FIG. 3 was drawn. In FIG. 3, the molar ratio is calculated from the mass ratio and the formula weight of each substance mixed, the value obtained by dividing the mole percent of the reaction product $BaY_2NiO_5$ by the mole percent of each BZCY (molar ratio) is indicated by the vertical axis, and the composition of the BZCY (weight ratio of the amount of the zirconium component mixed relative to the total amount of the zirconium component, the cerium component, and the yttrium component) is indicated by the horizontal axis.

As is obvious from FIG. 3, the amount of the reaction product $BaY_2NiO_5$ produced is decreased in the middle part of the horizontal axis. That is, the amount of the reaction product $BaY_2NiO_5$ produced is decreased compared with the case where the fuel electrode is formed by adding a Ni catalyst to BCY or BZY, and also is largely decreased from the change in production amount anticipated from the mixture ratios of the materials (indicated by the dashed line).

The reason for this can be assumed to be that formation of the solid solution stabilizes the perovskite phase, thereby decreasing reactivity.

[Fabrication of Fuel Cell]

Figure 7:
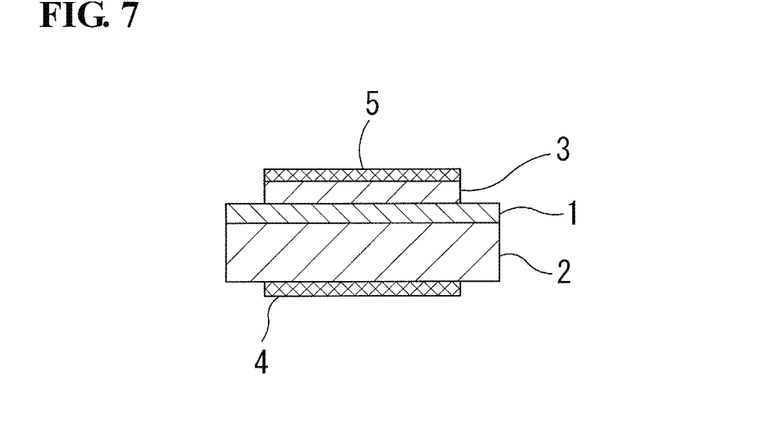
FIG. 7 is a schematic cross-sectional view of a single cell of a fuel cell.

As shown in FIG. 7, a solid electrolyte-electrode laminate provided with the fuel electrode formed by adding Ni to the BZCY44 includes an electrolyte layer 1, a fuel electrode 2, and an air electrode 3. Current collectors 4 and 5 formed of platinum mesh were provided on the surfaces of the fuel electrode 2 and the air electrode 3, and a fuel cell shown in FIG. 8 was fabricated. As a comparative example, a solid electrolyte-electrode laminate provided with a fuel electrode formed by adding Ni to the BZY was used.

Figure 8:
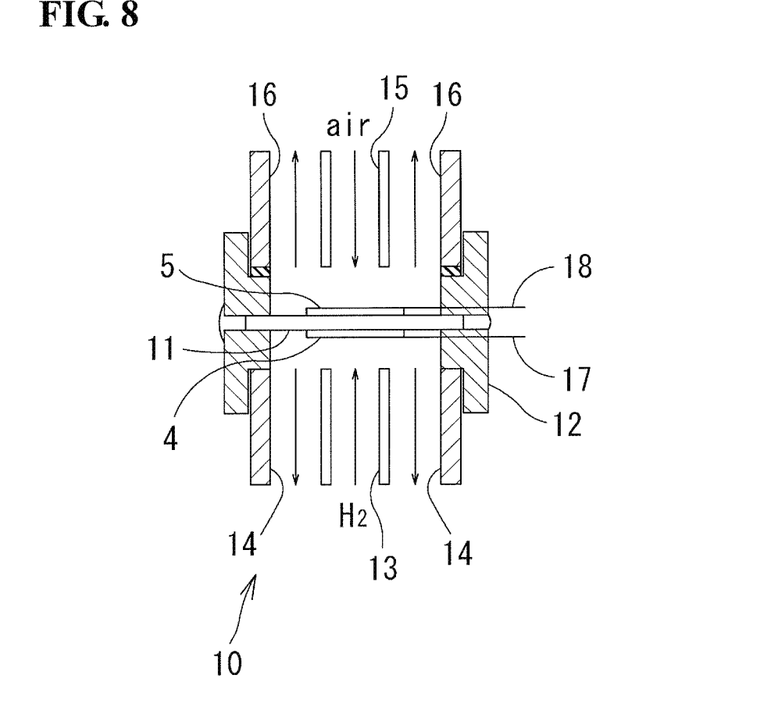
FIG. 8 is a schematic cross-sectional view of a fuel cell fabricated using the single cell of a fuel cell shown in FIG. 7.

The fuel cell 10 includes the solid electrolyte-electrode laminate 11 which is supported in the middle portion of a tubular case 12, flow channels 13 and 14 for causing fuel gas to act on the one side, and flow channels 15 and 16 capable of causing air to act on the other side. The platinum meshes 4 and 5 are respectively connected to leads 17 and 18 which extend to the outside. The current value and voltage value between the leads 17 and 18 were measured by a measuring instrument (not shown).

In the fuel cell 10, hydrogen as fuel gas was caused to flow to and act on the fuel electrode at 100 cc/min, and air was caused to flow to and act on the cathode at 100 cc/min. The electricity generation performance was measured when operated at 700° C. in the case where the fuel electrode formed of BZCY was used, and at 750° C. in the case where the fuel electrode formed of BZY was used.

Figure 9:
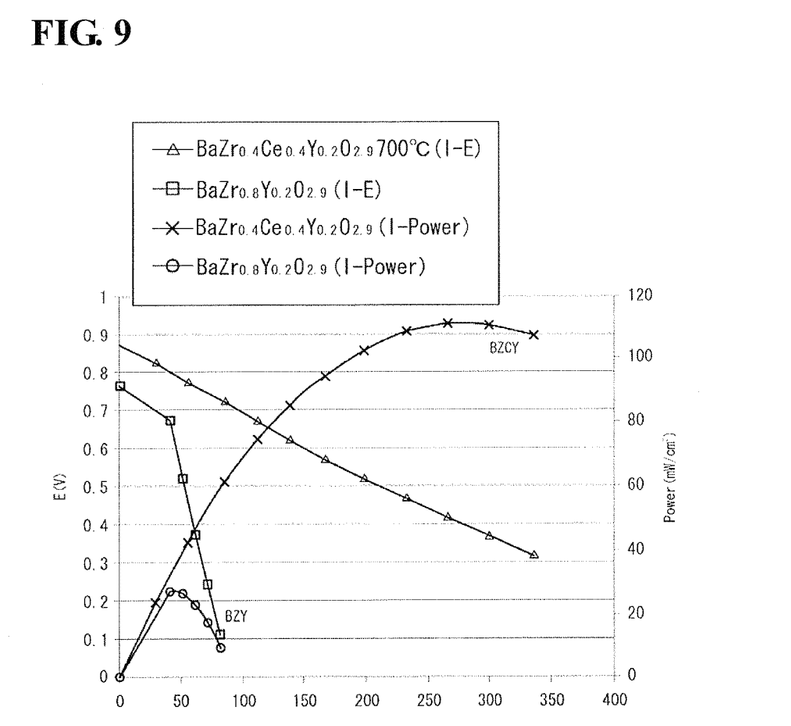
FIG. 9 is a graph showing the performance of the fuel cell shown in FIG. 8.

As shown in FIG. 9, in the solid electrolyte-electrode laminate including the fuel electrode formed of BZCY according to the embodiment, an electricity generation performance of 110 mW/cm$^2$ was obtained. In contrast, in the case where the fuel electrode was formed using BZY, only an electricity generation performance of 23 mW/cm$^2$ was obtained.

As is clear from FIG. 2, in order to secure $CO_2$ resistance, it is preferable to set the amount or the zirconium component in the solid electrolyte component constituting the fuel electrode to be more than 1/7 of the amount of the cerium component in terms of molar ratio. One the other hand, in order to secure electricity generation performance by suppressing reaction with the Ni catalyst component, it is preferable to set the amount of the zirconium component in the solid electrolyte component constituting the fuel electrode to be less than 7 times the amount of the cerium component in terms of molar ratio. That is, by setting the mixture ratio of the zirconium component to the cerium component in the solid electrolyte component constituting the fuel electrode to be 1:7 to 7:1 in terms of molar ratio, it is possible to obtain an electrode material for a fuel electrode having both $CO_2$ resistance and high electricity generation performance.

The embodiments disclosed this time are intended to be illustrative in all aspects, rather than restrictive. It is intended that the scope of the present invention is not limited to the embodiments described above, but is determined by appended claims, and includes all variations of the equivalent meanings and ranges to the claims.

INDUSTRIAL APPLICABILITY

It is possible to inexpensively provide an electrode material for a fuel electrode, the electrode material having $CO_2$ resistance and being capable of forming a fuel cell having high electricity generation performance.

REFERENCE SIGNS LIST

1 electrolyte layer
2 fuel electrode
3 air electrode
4 platinum mesh
5 platinum mesh
10 fuel cell
11 solid electrolyte-electrode laminate
12 tubular case
13 flow channel (fuel gas)
14 flow channel (fuel gas)
15 flow channel (air)
16 flow channel (air)
17 lead
18 lead

The invention claimed is:

1. An electrode material for a fuel electrode, the electrode material constituting a fuel electrode of a fuel cell including a proton-conductive solid electrolyte layer, comprising:
   a perovskite-type solid electrolyte component and a nickel (Ni) catalyst component,
   wherein the solid electrolyte component includes a barium component, a zirconium component, a cerium component, and a yttrium component; and
   the mixture ratio of the zirconium component to the cerium component in the solid electrolyte component is 1:1 in terms of molar ratio.

2. The electrode material for a fuel electrode according to claim 1, wherein the content of the nickel (Ni) catalyst component is 40% to 80% by volume relative to the total volume.

3. A solid electrolyte-electrode laminate which is formed by integrally sintering a solid electrolyte layer and a fuel electrode,
   wherein the fuel electrode is formed of the electrode material for a fuel electrode according to claim 1; and
   the solid electrolyte layer includes yttrium doped barium cerate (BCY), yttrium doped barium zirconate (BZY), or a solid solution of these materials.

4. The solid electrolyte-electrode laminate according to claim 3, wherein the solid electrolyte layer is composed of the same component as the solid electrolyte component in the electrode material for a fuel electrode.

5. A method for producing the solid electrolyte-electrode laminate according to claim 3, the method comprising:
   a fuel electrode molding step in which, by molding the electrode material for a fuel electrode, a fuel electrode molded body is formed;
   a solid electrolyte deposition step in which a solid electrolyte material is deposited on one surface of the fuel electrode molded body; and
   a sintering step in which the fuel electrode molded body on which the solid electrolyte material has been deposited is sintered.

6. A fuel cell comprising a fuel electrode formed of the electrode material for a fuel electrode according to claim 1.

7. A fuel cell comprising a fuel electrode formed of the electrode material for a fuel electrode according to claim 2.

8. The electrode material for a fuel electrode according to claim 1, wherein the mixture ratio of the zirconium component, the cerium component, and the yttrium component is 1:1:0.5.

9. The electrode material for a fuel electrode according to claim 8, wherein the content of the nickel (Ni) catalyst component is 40% to 80% by volume relative to the total volume.

10. A solid electrolyte-electrode laminate which is formed by integrally sintering a solid electrolyte layer and a fuel electrode,
    wherein the fuel electrode is formed of the electrode material for a fuel electrode according to claim 8; and
    the solid electrolyte layer includes yttrium doped barium cerate (BCY), yttrium doped barium zirconate (BZY), or a solid solution of these materials.

11. A fuel cell comprising a fuel electrode formed of the electrode material for a fuel electrode according to claim 8.

12. The solid electrolyte-electrode laminate according to claim 10, wherein the solid electrolyte layer is composed of the same component as the solid electrolyte component in the electrode material for a fuel electrode.

13. A method for producing the solid electrolyte-electrode laminate according to claim 10, the method comprising:
- a fuel electrode molding step in which, by molding the electrode material for a fuel electrode, a fuel electrode molded body is formed;
- a solid electrolyte deposition step in which a solid electrolyte material is deposited on one surface of the fuel electrode molded body; and
- a sintering step in which the fuel electrode molded body on which the solid electrolyte material has been deposited is sintered.

* * * * *